United States Patent [19]

Swenson

[11] 4,358,834

[45] Nov. 9, 1982

[54] SELF-DEPLOYING BUOY SYSTEM

[75] Inventor: Richard C. Swenson, Carriere, Miss.

[73] Assignee: The United States of America as represented by the Secretary of the Navy, Washington, D.C.

[21] Appl. No.: 254,809

[22] Filed: Apr. 16, 1981

[51] Int. Cl.³ .............................................. H04B 1/59

[52] U.S. Cl. ........................................ 367/4; 367/173

[58] Field of Search .................................. 367/4, 173

[56] References Cited

U.S. PATENT DOCUMENTS

| | | | |
|---|---|---|---|
| 2,422,337 | 6/1947 | Chilowsky | 177/386 |
| 3,309,649 | 3/1967 | Ballard et al. | 340/2 |
| 3,628,205 | 12/1971 | Starkey et al. | 340/2 |
| 3,631,550 | 1/1972 | Bullen | 9/8 |
| 3,772,639 | 11/1973 | Snyder | 340/2 |
| 3,921,120 | 11/1975 | Widenhofer | 340/2 |
| 3,991,475 | 11/1976 | Segrest et al. | 33/126.5 |
| 4,004,265 | 1/1977 | Woodruff et al. | 340/2 |
| 4,186,370 | 1/1980 | Cupolo et al. | 367/4 |
| 4,189,703 | 2/1980 | Bennett | 367/173 X |
| 4,189,786 | 2/1980 | Adler | 367/4 |
| 4,216,535 | 8/1980 | Bennett | 367/4 |
| 4,272,835 | 6/1981 | Flood et al. | 367/4 |

FOREIGN PATENT DOCUMENTS

| | | | |
|---|---|---|---|
| 996044 | 6/1965 | United Kingdom | 367/4 |

*Primary Examiner*—Richard A. Farley

*Attorney, Agent, or Firm*—R. F. Beers; Francis I. Gray

[57] ABSTRACT

A self-deploying buoy system which will moor itself in various depths of water. The system has a fixed mid-water buoy and canister. In one end of the canister is an RF telemetry buoy and upper cable pack. In the other end of the canister is a lower cable pack, sensor and anchor assembly. When deployed all the cable in both the upper and lower cable packs is deployed under the force of gravity until no cable is left in either pack.

3 Claims, 3 Drawing Figures

SELF-DEPLOYING BUOY SYSTEM

BACKGROUND OF THE INVENTION

1. Field of the Invention

The present invention relates to buoy systems, and more particularly to an expendable, air-deployable, self-deploying system which will moor itself in various depths of water.

2. Description of the Prior Art

A requirement exists for an expendable, air-deployable, self-deploying buoy system which will moor itself in various depths of water, place and hold steadily a multi-channel sensor near the sea floor, provide a surface buoy RF link and remain operational for several months. Due to size, weight and cost constraints a small, low-cost, Kevlar-reinforced, single conductor cable is used which is payed out of a bale. The remaining coil in the partially spent bale after the system is deployed results in signal transmission problems because of the inductance in the coil. Also, the current systems are mechanically complex, requiring cable stoppers and associated bottom sensors to stop cable payout when the anchor hits the sea floor. Therefore, it is desired to produce a buoy system which is simpler and more reliable, and which avoids the coil inductance problem.

SUMMARY OF THE INVENTION

Accordingly, the present invention provides a self-deploying buoy system which will moor itself in various depths of water. The system has a fixed mid-water buoy and canister. In one end of the canister is an RF telemetry buoy and upper cable pack. In the other end of the canister is a lower cable pack, sensor and anchor assembly. When deployed all the cable in both the upper and lower cable packs is deployed under the force of gravity until no cable is left in either pack.

Therefore, it is an object of the present invention to provide a self-deploying buoy system which improves signal transmission, and which is simpler, more reliable and less expensive.

Other objects, advantages and novel features of the present invention will be apparent from the following detailed description when used in conjunction with the appended claims and attached drawing.

DESCRIPTION OF THE PREFERRED EMBODIMENT

Figure 1:
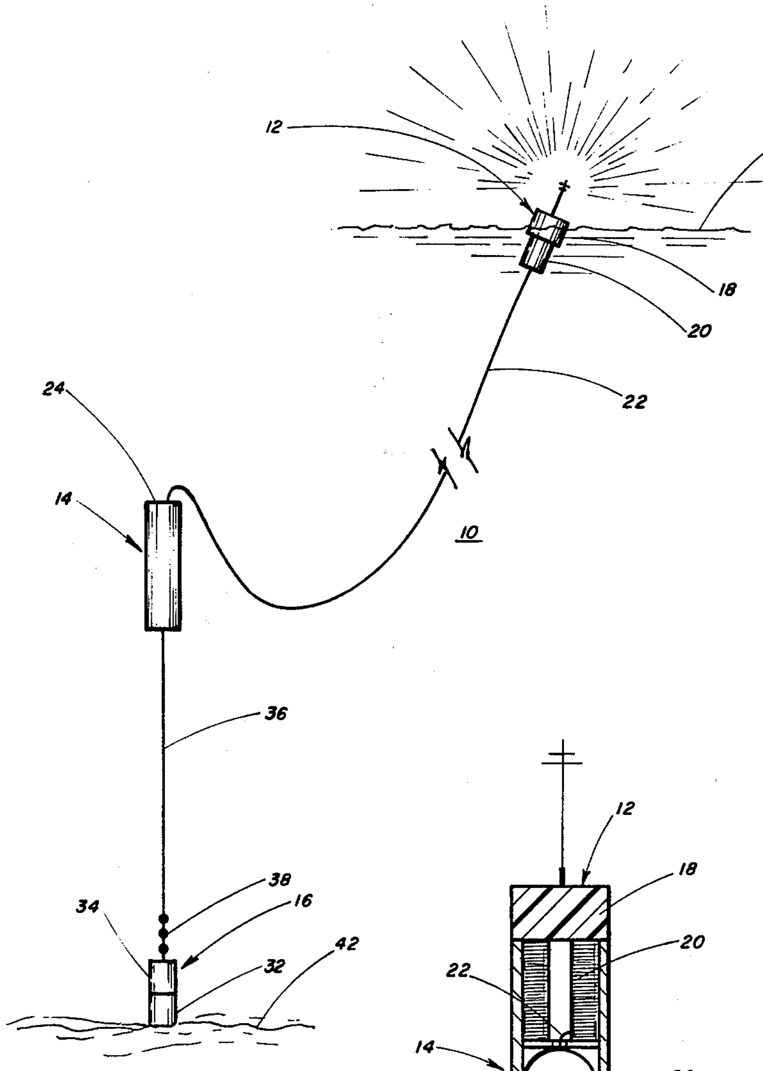
FIG. 1 is a diagrammatic view of a deployed buoy system according to the present invention.
Figure 2:
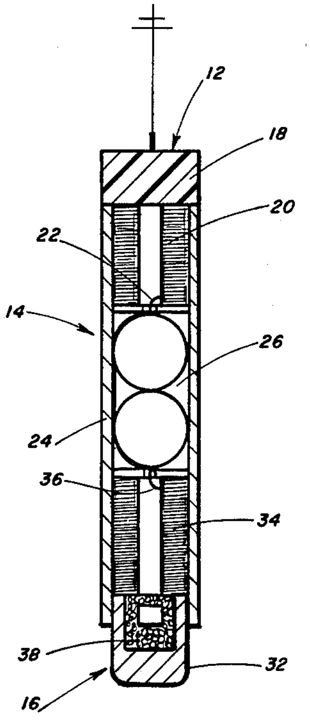
FIG. 2 is a cross-sectional view of the self-deploying buoy system prior to deployment.
Figure 3:
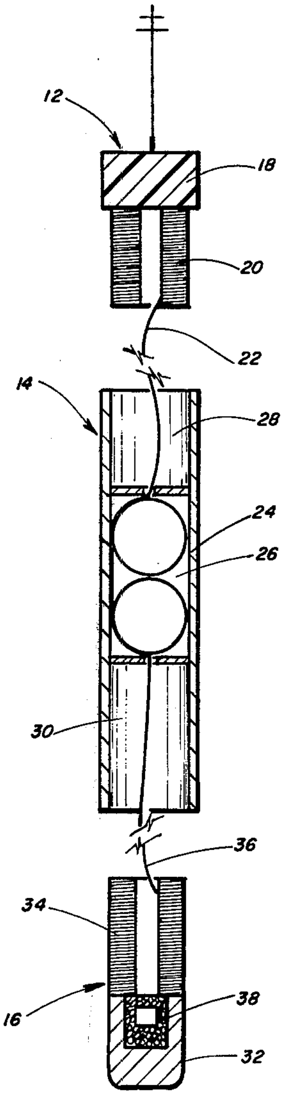
FIG. 3 is an exploded view of the self-deploying buoy system shortly after deployment.

Referrring now to FIGS. 1–3 a self-deploying buoy system 10 is shown having three major components: (1) a surface buoy assembly 12, (2) a mid-water buoy assembly 14 and (3) a sea floor assembly 16. The surface buoy assembly 12 has an electronics package 18 such as an RF telemetry link and an upper cable pack 20 which contains a baled upper cable 22. The mid-water buoy assembly 14 has a cylindrical canister 24 with a central buoyancy section 26. The surface buoy assembly 12 nests within the upper section 28 of the cylindrical canister 24, and the sea floor assembly 16 nests within the lower section 30 prior to deployment. The sea floor assembly 16 has an anchor section 32 and a lower cable pack 34 which contains a baled lower cable 36. The free end of the upper cable 22 is attached to the canister 24 by suitable means as is the free end of the lower cable 36 to provide electrical continuity between the surface buoy assembly 12 and the sea floor assembly 16. Sensors 38 are incorporated in the end of the lower cable 36 attached to the sea floor assembly 16. Both the upper cable 22 and the lower cable 36 are small, braided Kevlar-reinforced, single conductor cables.

In operation the buoy system 10 is deployed on the ocean surface 40. The sea floor assembly 16 separates and begins to descend, leaving the mid-water buoy assembly 14 and the surface buoy assembly 12 on the surface 40. When the lower cable 22 is spent in the lower cable pack 34, the sensors 38 are drawn out of the anchor section 32 and the mid-water buoy assembly 14 is drawn down below the surface 40, releasing the surface buoy assembly 12. The upper cable 22 is drawn out of the upper cable pack 20 as the mid-water buoy assembly 14 is pulled down until the anchor section 32 hits the sea floor 42. The remainder of upper cable 22 is drawn out under its own weight and the agitation of the surface waves.

Since it is not practical to fabricate many lengths of small perfect cable in long lengths such as 21,000 feet without using some scrap, more than one upper cable pack 20 is available depending upon the depth of the water when the buoy system 10 is to be deployed. For example three cable packs 20 may be provided for the following water depth zones, 777-2333 feet, 2333-7000 feet and 7000-21,000 feet. The result is reduced cost due to less cable for shallower sites, and due to the lessened requirement for lengthy cables, making scraps from the longer cables available to provide the shorter lengths. Additionally since no unspent cable is left in the cable pack mutual inductance and, thus, signal transmission distortion is minimized. Finally, the overall design is simpler which increases reliability while reducing cost.

Thus, the present invention provides a self-deploying buoy system having a surface electronics buoy, a mid-water buoy to hold sensors essentially vertical with reference to the sea floor while decoupling the sensors from the surface agitation, and an anchor which holds the sensors stationary at the sea floor. The result is a system which reduces the required weight of the anchor and buoyancy, requires no complex tether to decouple the motion of the surface buoy from the subsurface buoy, achieves greater endurance, reduces drag and fishbite probability, enhances the stability of the surface buoy due to the spent cable pack, accommodates more sensor and/or additional floatation near the anchor and makes more room available for instrumentation, buoyancy, batteries, etc.

I claim:

1. A self-deploying buoy system comprising:

a mid-water buoy assembly having a buoyancy section;

a surface buoy assembly having an upper cable pack extending downward from said surface buoy assembly and containing a baled upper cable, said surface buoy assembly being nested in one end of said mid-water buoy assembly prior to deployment with the free end of said upper cable attached to said mid-water buoy assembly; and a sea floor assembly having a lower cable pack extending upward from said sea floor assembly and containing a baled lower cable and sensors, said sea floor assembly being nested in the other end of said mid-water buoy assembly prior to deployment with the free end of said lower cable attached to said mid-water buoy assembly to provide electrical continuity between said sensors and said surface buoy assembly;

whereby when said buoy system is deployed said sea floor assembly sinks to the bottom, said mid-water buoy assembly holds said lower cable and sensors vertically and all said upper and lower cables are spent from said upper and lower cable packs.

2. A self-deploying buoy system as recited in claim 1 wherein said seafloor assembly further comprises means for anchoring said seafloor assembly to the sea floor.

3. A self-deploying buoy system as recited in claims 1 or 2 wherein said surface buoy assembly further comprises means for transmitting data from said sensors.

* * * * *